UNITED STATES PATENT OFFICE.

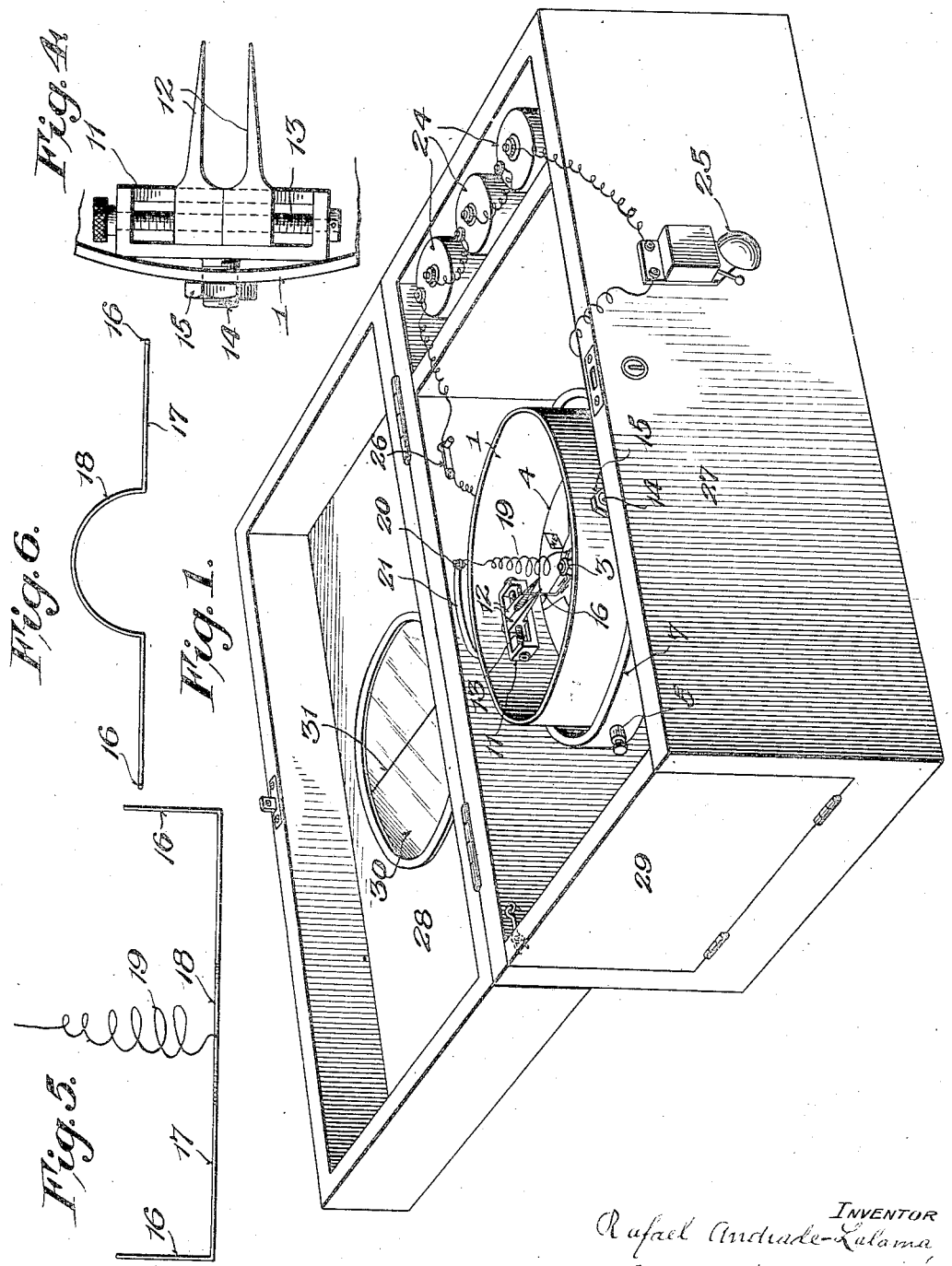

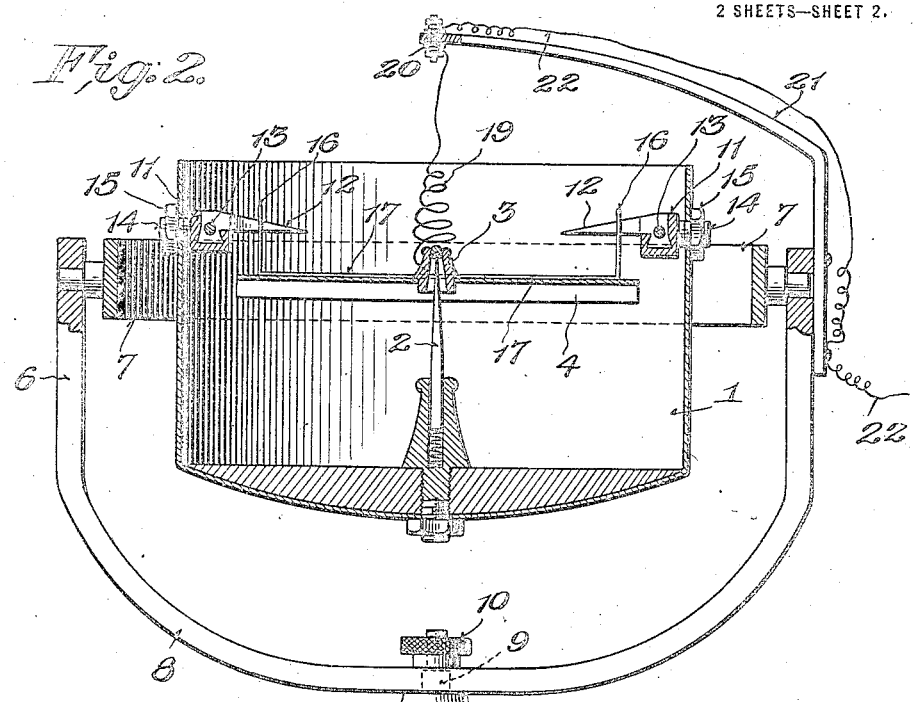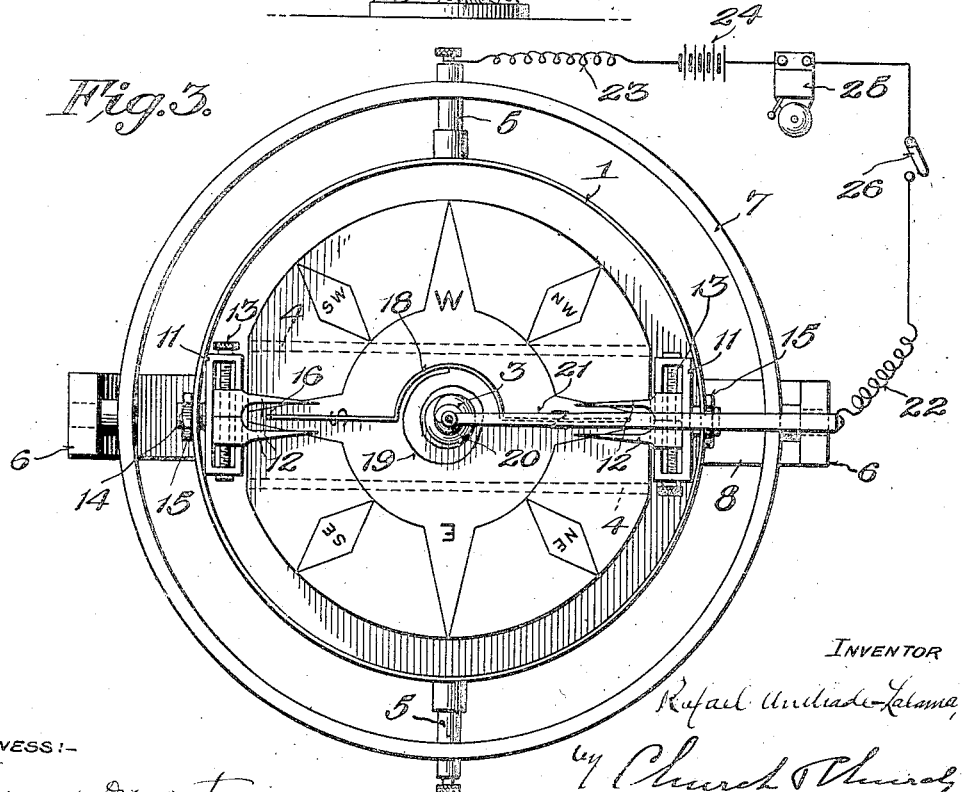

RAFAEL ANDRADE-LALAMA, OF QUITO, ECUADOR.

TELLTALE COMPASS.

1,275,570. Specification of Letters Patent. Patented Aug. 13, 1918.

Application filed December 27, 1917. Serial No. 209,104.

*To all whom it may concern:*

Be it known that I, RAFAEL ANDRADE-LALAMA, a citizen of the Republic of Ecuador, residing at Quito, in the Republic of Ecuador, have invented certain new and useful Improvements in Telltale Compasses; and I do hereby declare the following to be a full, clear, and exact description of the same, reference being had to the accompanying drawings, forming part of this specification.

The object of the present invention is to provide an apparatus for use on board ship, to give an indication and warning of any material deviation of the vessel from its predetermined course, the warning being in the nature of an audible signal or signals which may be located at proper points for notification to the commanding officer or officers. The operation of the device is automatic and entirely beyond the control of the helmsman or other persons who might be inclined to tamper with the mechanism in order to conceal the fact that the vessel has been caused or allowed to deviate from the proper course.

The importance and value of an apparatus of this kind will be at once apparent to those familiar with navigation and a successful solution of the problem constitutes an effective safeguard, both to the lives of the passengers and vessel itself against either accidental deviation through bad or inefficient steering or through the intentional acts of parties who might wish to effect the destruction of lives and property.

For carrying the invention into practice, a ship's compass or the essential working parts thereof, modified to suit present conditions is employed as the controlling element, suitable means being provided whereby the deviation of the ship from its course will effect the closing of electrical contacts and the sounding of audible alarms or signals located either in proximity to the apparatus or at a distant point, as may be desired, the whole controlling mechanism being securely inclosed in a compartment which is locked against access by unauthorized persons, but preferably having a sight opening through which the mechanism may be observed should this be desirable or in case the compass is to be used as an ordinary ship's compass in the binnacle of the vessel.

Referring to the accompanying drawings,—

Figure 1 is a perspective view of an apparatus embodying the present improvements with the cover of the box or compartment thrown open and some of the parts shown more or less diagrammatically.

Fig. 2 is a sectional elevation of the working parts of the control or compass members of the device.

Fig. 3 is a plan view of the parts shown in Fig. 2, with the circuit and signal diagrammatically illustrated.

Fig. 4 is a plan view on an enlarged scale of the adjustable contacts for the control circuit.

Figs. 5 and 6 are detail views of the movable contacts showing the form of the same and the preferred method of establishing the circuit connection thereto.

In carrying the invention into practice a ship's compass of approved construction is preferably employed and this compass may conveniently embody a compass box or bowl 1 from the weighted lower end of which the spring supported pivot 2 extends upwardly to form the seat for the "dab" or socket 3 on which the compass card 4 is mounted. The compass card 4 embodies the usual magnetic bars, and in so far as the compass feature is concerned, operates no differently from the ordinary ship's compass. The compass box or bowl which is usually of metal is supported in gimbals 5 and 6, including the customary gimbal ring 7 and a downwardly extending bow or frame 8. The frame 8 is adjustably mounted to turn on a center which is preferably substantially coaxial with the compass card, and as a convenient construction it seats on a fixed stud or base 9 and is adapted to be clamped in its position of angular adjustment by a clamp or set nut 10, access to which may be had in a manner to be presently described.

The compass card is adapted to carry what may be termed the movable contacts in the electric signal circuit and the compass box or bowl carries the relatively fixed but adjustable contacts with which the movable contacts coöperate, the position of the adjustable contacts being such that the circuit will be closed when the permissible deviation of the vessel from the predetermined course is exceeded. The so-called fixed or adjustable contacts illustrated in detail in Fig. 4 are preferably mounted directly on the cylindrical wall of the compass box or bowl by means of a carriage or frame 11. The carriage forms a slideway for the bases of the contacts 12 and has journaled therein an adjusting screw 13 with right and left hand threads engaging the respective contacts, whereby, by turning said screw in one direction or the other, the contacts may be moved toward and from each other, so as to increase or decrease the space between them. The carriage or frame 11 is conveniently secured to the cylindrical wall of the compass bowl by a central stud 14 passing through said wall and adapted for the reception of a clamping nut 15 by which the frame is held rigidly in place and good electrical contact with the metal wall of the box established. The contacts 12 project over the compass card 4 and mounted on said card in position to project upwardly between the contacts 12, are movable contacts 16. The movable contacts 16 are made relatively small or light so as to avoid imposing an increased load upon the compass card and are conveniently the upstanding needle-like ends of a base wire or member 17 secured to the face of the compass card and extended around the dab or pivot socket, as shown clearly in Figs. 3 and 6, at 18.

Inasmuch as the dab or socket seating on the pivot is customarily of agate or other non-conducting material and the point of contact between the pivot and its socket is of such a character that even though made of conducting material, a desirable electrical connection could not be established, I prefer to connect the movable contacts in the circuit by means of an extended and flexible connection, preferably in the form of a fine spiral conductor 19 which at its lower end is electrically connected with the base of the contact 17 and at its upper end and immediately over the pivot of the compass card is connected with a fixed circuit connection at 20. The connection with the movable contacts is thereby suspended or its weight substantially borne by the fixed support at 20 and the resistance to the turning of the compass card under magnetic influence is reduced to a minimum. As a convenient fixed support at 20, an overhanging arm 21 is attached to the gimbal yoke 8 by suitable fastenings, as shown in Fig. 2, and the insulated circuit conductor extends along this arm to a point where the lead wire 22 may be taken off through a flexible spiral or section of the wire, such as will permit the adjustment of the compass members about the support 9 without interference. The circuit connection with the contacts 12 is established through the wall of the compass bowl by a circuit wire connection 23 which may conveniently lead to a binding post on one of the trunnions of the gimbal joint as shown in Fig. 3. The circuit includes a battery or generator 24, an audible alarm device 25 and preferably a switch or key 26 which may be opened or closed at will.

The whole device thus far described is preferably mounted in a box or chamber conventionally illustrated in Fig. 1 and embodying a base part 27 and a cover 28 which may be closed and locked to prevent access to the parts of the device. In Fig. 1 the alarm is conventionally illustrated as attached to the exterior of the box and the generator or batteries are illustrated as contained within the box. To give access to the clamping nut 10 for setting the compass bowl and card, according to the predetermined course of the vessel, one part of the side wall of the box is made in the form of a door 29 which may be turned down or moved aside after the cover 28 is opened, or if desired, any suitable form of locking mechanism may be provided for it. In the cover 28 there is preferably provided a window or a sight opening closed by transparent material as at 30, and across this opening there extends a line or indicator 31 which, when the device is placed in position for use, is parallel with the keel line, and, therefore, shows the direction in which the vessel should progress.

Obviously, the box or chamber may be of any desired form to serve as a binnacle, that illustrated being designed to be rigidly fastened to some permanent portion of the vessel so as to always occupy a definite and fixed position with relation to the keel line or longitudinal axis of the vessel.

In operation, the desired course of the vessel having been predetermined, and, perchance, the vessel having been set on that course, the compass bowl is adjusted on its vertical axis until the movable contacts carried by the compass card lie substantially midway between the adjustable contacts 12, in which position the compass bowl is clamped against further rotation on its vertical axis, but is free to swing and conform to the pitch and roll of the vessel.

Obviously, the distance between the adjustable contacts 12 determines the permissible deviation from the desired course before the alarm is sounded, and by adjusting the contacts toward or from each other, the permissible deviation may be varied in accordance with the desired latitude to be allowed within which the helmsman must operate, in the steering of the vessel.

Two pairs of contacts are preferably employed in order to reduce as far as possible resistance in the circuit. Not only is the resistance reduced by providing multiple contacts, but should one set be burned, oxidized or otherwise injured, the other set will be operative and enable the device to perform its functions.

What is claimed is:

1. A mariner's compass embodying a box adapted to occupy a fixed position with relation to the keel line or longitudinal axis of the vessel and having an indication thereon conforming to said keel line or longitudinal axis, a compass bowl and card mounted in gimbal supports in said box, said gimbal supports and bowl being adjustable about a vertical axis substantially in line with the axis of the card, whereby the bowl and card may be set at the proper angle with relation to the predetermined course and longitudinal axis of the vessel, and an alarm circuit including a generator, an alarm and contacts carried respectively by the bowl and card, the contacts carried by the bowl being so located that a radial plane midway between them bears a fixed relation to the bowl, said contacts being spaced from each other a distance corresponding to the permissible deviation of the vessel from its course, whereby the circuit will be closed and the alarm sounded when excessive deviation occurs.

2. A mariner's compass embodying a compass bowl and card mounted in gimbal supports adjustable about a vertical axis substantially in line with the axis of the card, whereby the bowl and card may be set at a proper angle with relation to the predetermined course of the vessel, circuit contacts carried by the bowl and card respectively, a circuit connection leading to the bowl, a circuit connection embodying a flexible coil 19 and arm 21 leading to the contact carried by the compass card, and an electric circuit including an alarm and generator, substantially as described.

3. A mariner's compass embodying a compass bowl and card mounted in gimbal supports adjustable about a vertical axis substantially in line with the axis of the card, whereby the bowl and card may be set at the proper angle with relation to the predetermined course of the vessel, a pair of contacts, means whereby the contacts are so carried by the bowl that the radial plane midway between them bears a fixed relation to the bowl, and means whereby the contacts are adjustable toward and from each other in proximity to the compass card, said contacts being in electrical connection with the wall of the bowl, a movable contact mounted on the compass card and projecting between the adjustable contacts on the bowl, an alarm circuit including a generator and an alarm having circuit connections extending respectively to the wall of the bowl and to the the movable contact on the compass card, the last-mentioned circuit connections including a flexible conductor suspended from a point above the compass card, whereby the movements of the card under magnetic influence are not retarded.

4. A mariner's compass embodying a compass bowl and card mounted in gimbal supports adjustable about a vertical axis, whereby the bowl and card may be set at the proper angle with relation to the predetermined course of the vessel, two pairs of contacts mounted on the compass bowl and projecting in proximity to the compass card, a pair of movable contacts carried by the compass card and projecting respectively between the contacts of the first mentioned pairs, an alarm circuit including an alarm and a generator and circuit connections included in said circuit and leading respectively to the pair of contacts on the compass card and to the two pairs of contacts on the compass bowl.

5. In a mariner's compass embodying a compass bowl and card mounted in gimbal supports, an alarm circuit contact member carried by the compass card, an alarm circuit contact device carried by the compass bowl and embodying a pair of contacts movable toward and from each other, a frame in which said contacts are mounted for adjustment, and an adjusting screw having right and left hand threads thereon for moving said contacts toward and from each other, an electric circuit including an alarm, a generator and circuit connections leading respectively to the contacts on the card and bowl.

RAFAEL ANDRADE-LALAMA.